United States Patent [19]

Peng et al.

[11] Patent Number: 4,852,854
[45] Date of Patent: Aug. 1, 1989

[54] ELECTROMAGNETIC PERMEABLE-SHELL-FREE DIAPHRAGM VALVE

[75] Inventors: Yu-Yin Peng; Shih-Lien Fu, both of Hsinchu Hsien, Taiwan

[73] Assignee: Industrial Technology Research Institute, Hsinchu Hsien, Taiwan

[21] Appl. No.: 175,754

[22] Filed: Mar. 31, 1988

Related U.S. Application Data

[63] Continuation-in-part of Ser. No. 82,086, Aug. 5, 1987, Pat. No. 4,769,650.

[51] Int. Cl.$^4$ .............................................. F16K 31/06
[52] U.S. Cl. ........................... 251/129.17; 251/129.15
[58] Field of Search ....................... 251/129.17, 129.15

[56] References Cited

U.S. PATENT DOCUMENTS 2,829,860  4/1958  Garner et al. .................... 251/129.17
3,429,552  2/1969  Huley et al. ..................... 251/129.17
3,743,240  7/1973  Merriner et al. ................ 251/129.17
4,530,486  7/1985  Rusnak ........................... 251/129.17

Primary Examiner—Arnold Rosenthal
Attorney, Agent, or Firm—Harness, Dickey & Pierce

[57] ABSTRACT

An electromagnetic permeable-shell-free diaphragm valve comprising a shell, a coil, a stator, a magnetic flux permeable block, a spring seat, an adjusting block, a valve stem, a diaphragm, a coil spring, and a valve seat. The diaphragm of the valve isolates the slide portion of the stem from the liquid, so that the reciprocating motions of the valve stem will not be impeded when the liquid is dehydrated. Furthermore, it is not necessary to install a permeable shell, so that the manufacturing cost is lower than that of the conventional valve, and the efficiency of the heat dissipation will be improved, particularly at high-frequency operation, since the coil is directly disposed outside the shell of the valve.

4 Claims, 6 Drawing Sheets 4,852,854

ELECTROMAGNETIC PERMEABLE-SHELL-FREE DIAPHRAGM VALVE

CROSS-REFERENCE TO RELATED APPLICATION

This is a continuation-in-part of U.S. patent application Ser. No. 07/082,086, filed on Aug. 5, 1987, Pat. No. 4,769,650, dated Sept. 6, 1988.

BACKGROUND OF THE INVENTION

The present invention relates to a diaphragm valve, and especially to an electromagnetic permeable-shell-free diaphragm valve.

The 07/082,086 application discloses an automatic ink jet marking system which comprises a nozzle set, an ink supply device, and a microcomputer. The valve is installed in the nozzle set for switching the flow of the ink which is pressurized by compressed air. That is, the ink will be pumped toward a nozzle when the valve is actuated to open, and the flow of the ink will be obstructed when the valve is actuated to close.

The U.S. Pat. No. 4,378,564 titled "Ink Jet Printing Apparatus and Process" issued to Printos B.V. of N.L., Naarden, Netherlands on Mar. 29, 1983 discloses a solenoid valve shown in FIG. 7, wherein the coil 10 incorporates with the spring 12 to actuate the valve stem 11 to move rightward and leftward, and accordingly the pressurized ink flows toward a nozzle through the path shown by the arrows A and A'.

The 07/082,086 application also discloses an electromagnetic valve shown in FIG. 6, wherein the coil 20 incorporates with the spring 22 to actuate the valve stem 21 to move rightward and leftward, and accordingly the pressurized ink flows toward a nozzle along the direction shown by the arrows B and B', and the urging force induced by the spring 22, which pushes the valve stem 21 toward the valve seat 26, is substantially adjusted by means of screwing the bolt 23 in or out of the inner hole of the sleeve member 24. Similarly, the stroke of the stem 21 can be adjusted by screwing the sleeve member 24 in or out of the shell 25.

Both of the two valves described above are constructed in such a manner that the valve stem is immersed in the ink, and the reciprocating motions of the valve stem are impeded when the ink is dehydrated.

Furthermore, the construction of the valve disclosed in the 07/082,086 application is too complicated to be produced more cheaply or to be made smaller.

In addition, the high-frequency response of the two valves described above is poor due to the bouncing phenomenon induced between the valve seat and the rigid end portion of the valve stem, and the quantity of the ink jetted out will fluctuate time after time when bouncing occurs, so that it is difficult to facilitate the valves to operate at high frequency.

Besides, the valve shell enclosing the coil will hinder the dissipation of the heat produced by the coil during operation, and heating will change the quality of the ink.

SUMMARY OF THE INVENTION

It is therefore an object of this invention to provide an electromagnetic permeable-shell-free diaphragm valve which is constructed to isolate the ink (or the liquid) to be pumped from the valve stem so as to avoid the impediment of the motion of the valve stem.

It is another object of this invention to provide a simple construction of an electromagnetic permeable-shell-free diaphragm valve to lower the manufacturing cost and to facilitate the assembly operation of the valve.

It is a further object of this invention to provide an electromagnetic permeable-shell-free diaphragm valve which can eliminate the bouncing phenomenon induced between the valve seat and the valve stem, so as to enhance its high-frequency response.

In accordance with the present invention, an electromagnetic permeable-shell-free diaphragm valve comprises:

a shell made of non-permeable material;

a coil wound around the outside of the shell;

a stator made of permeable material, fixed within the shell in the vicinity of the coil;

a valve stem made of permeable material, for being slidable within the shell, having a first end portion being opposite to the stator and a second end portion;

an elastic diaphragm fixedly secured to the end portion of the valve stem;

means for urging the first end portion of the stem apart from the stator;

a valve seat disposed within the shell for securing the elastic diaphragm to form a room therebetween;

an inlet pipe communicating with the room; and an outlet pipe communicating with the room, having one end rim penetrating into the room, which end rim is opposite to the elastic diaphragm, the elastic diaphragm urges the end rim to block the outlet pipe by the urging means, and when an electric current passes through the coil, the magnetic flux induced by the coil drives the first end portion of the valve stem to move against the urging force of the urging means toward the stator and subsequently drives the elastic diaphragm to leave the end rim and open the outlet pipe.

Other and further objects, features and advantages of this invention will appear more fully in the following description.

BRIEF DESCRIPTION OF THE DRAWINGS

This invention will be explained in more detail on the basis of an exemplary embodiment with reference to the drawings, in which.

DETAILED DESCRIPTION OF THE PREFERRED EMBODIMENT

Figure 3:
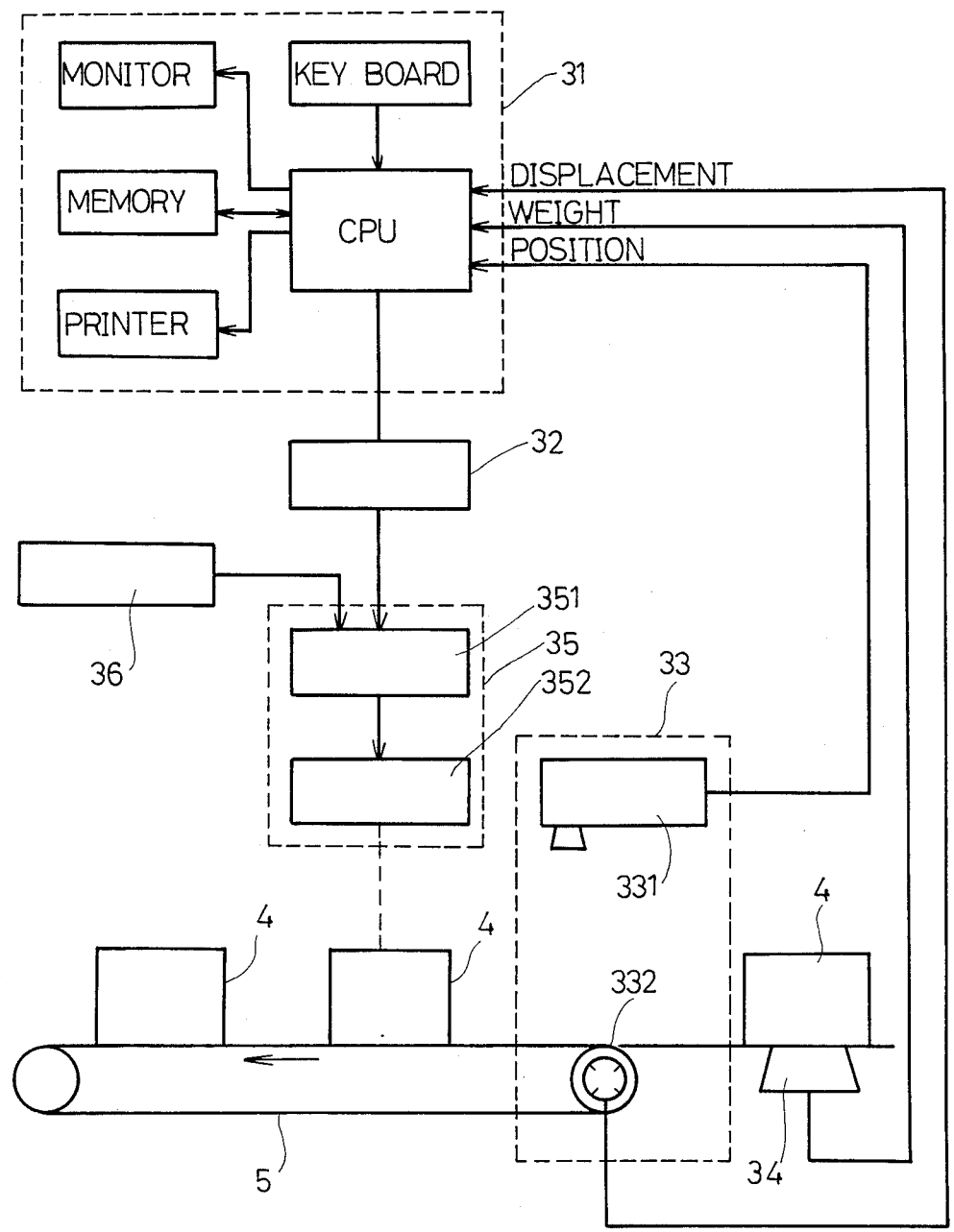
FIG. 3 is a block diagram of an automatic ink jet marking system which utilizes the electromagnetic permeable-shell-free diaphragm valve of this invention.

As shown in FIG. 3, the automatic ink jet marking system, which utilizes the electromagnetic permeable-shell-free diaphragm valve of this invention, comprises a microcomputer 31, a driving circuit 32, a scale 34, an ink jet assembly 35, and an ink supply device 36. The automatic ink jet marking system jets the ink in a form of dot matrix onto the carton 4 to make marks such as weight, contents, etc.

During operation, the carton 4 is weighed by means of the scale 34 first, and subsequently the weight of the carton 4 is inputted to the microcomputer 31. When the carton 4 is transported to the sensor assembly 33, the front of the carton 4 will be detected by the position sensor 331 to find the exact position of the carton 4, and simultaneously the speed sensor 332 mounted on the shaft of conveyor 5 inputs the speed of the carton 4 placed on the conveyor 5 to facilitate the microcomputer 31 to determine the timing and the frequency of the ink jetting, and then the microcomputer 31 controls the timing and the frequency of the switching of the electromagnetic permeable-shell-free diaphragm valve disposed within the valve unit 351 of the ink jet assembly 35 by means of the driving circuit 32. By this arrangement, pressurized ink supplied by the ink supply device 36 is pumped by the electromagnetic permeable-shell-free diaphragm valve, and is jetted onto the carton 4 through the nozzle unit 352.

Figure 4:
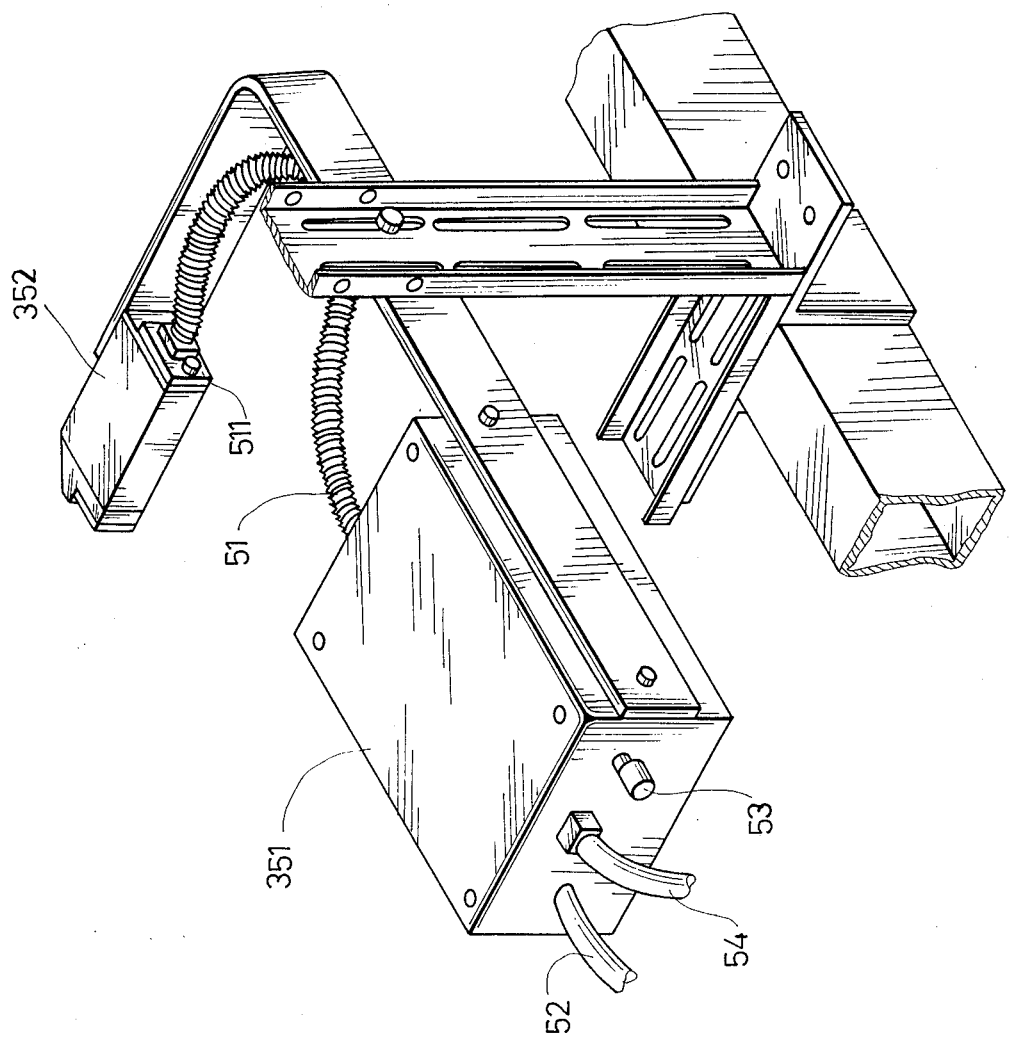
FIG. 4 is a perspective view showing the outer appearance of the valve unit and the nozzle unit of the system shown in FIG. 3.

As shown in FIG. 4, the ink jet assembly 35 comprises a valve unit 351 and a nozzle unit 352, and the valve unit 351 is communicated with the nozzle unit 352 by means of a sheath tube 51. The power cable 54 supplies power to the electromagnetic permeable-shell-free diaphragm valve 60 (see FIG. 5), and the gas exhausting pipe 53 is provided for removing the residual gas within the ink transporting tube (not shown) during the initiation of jetting. The pressurized ink from the ink supply device 36 is introduced into the valve 60 by way of the inlet pipe 52 and is pumped to the nozzle unit 352 by way of the outlet hose 693 (see FIG. 5) sheathed in the sheath tube 51.

Figure 5:
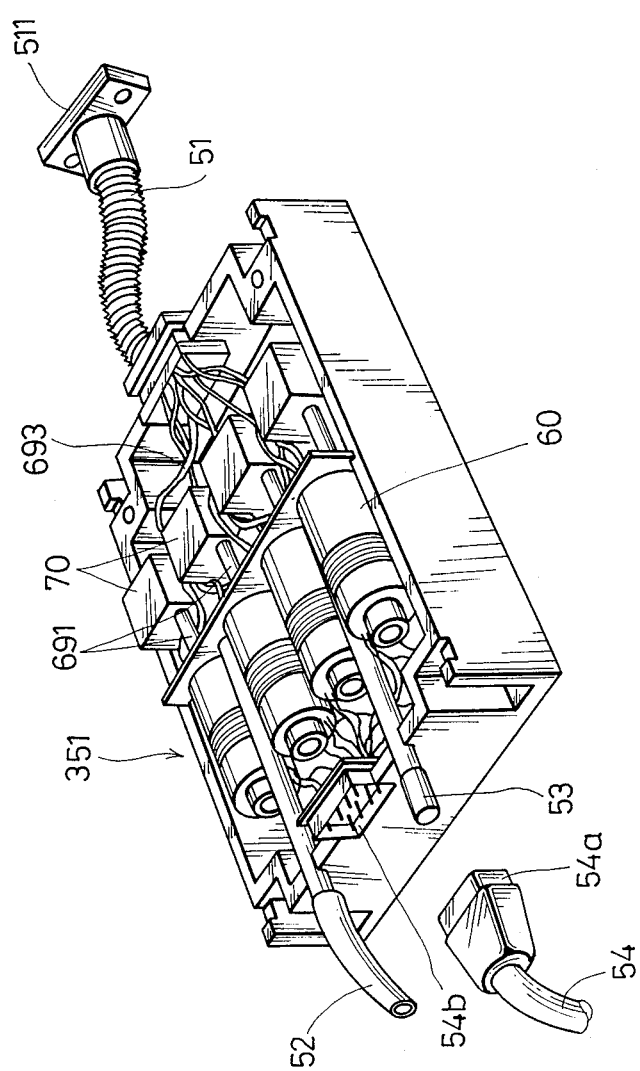
FIG. 5 is a perspective view showing the interior construction of the valve unit shown in FIG. 4.
Figure 7:
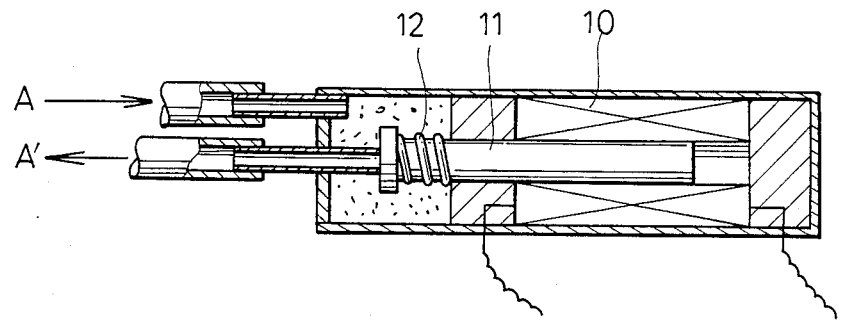
FIG. 7 is a sectional view showing the construction of the valve disclosed in the U.S. Pat. No. 4,378,564.
Figure 6:
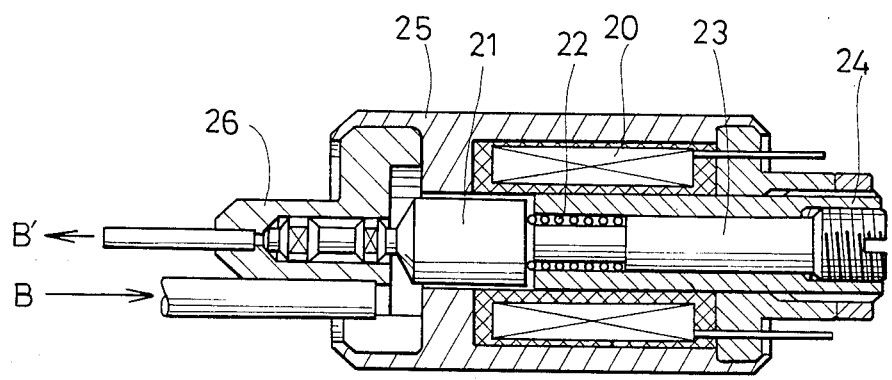
FIG. 6 is a sectional view showing the construction of the valve disclosed in the 07/082,086 application.

The interior construction of the valve unit 351 is shown in FIG. 5. As shown in FIG. 5, the valve unit 351 comprises eight valves 60 and eight distribution chambers 70. The ink introduced by the inlet pipe 52 will enter the valves 60 by way of distribution chambers 70 and inlet pipes 691, and then will be pumped toward the nozzle unit 352 at the predetermined timing by the valves 60. The numerals 511, 54a, 54b represent the connecting plate of the sheath tube 51, the plug of the power cable 54, and the socket of the power cable 54, respectively.

The following is the description of the construction of the electromagnetic permeable-shell-free diaphragm valve in accordance with this invention.

Figure 1:
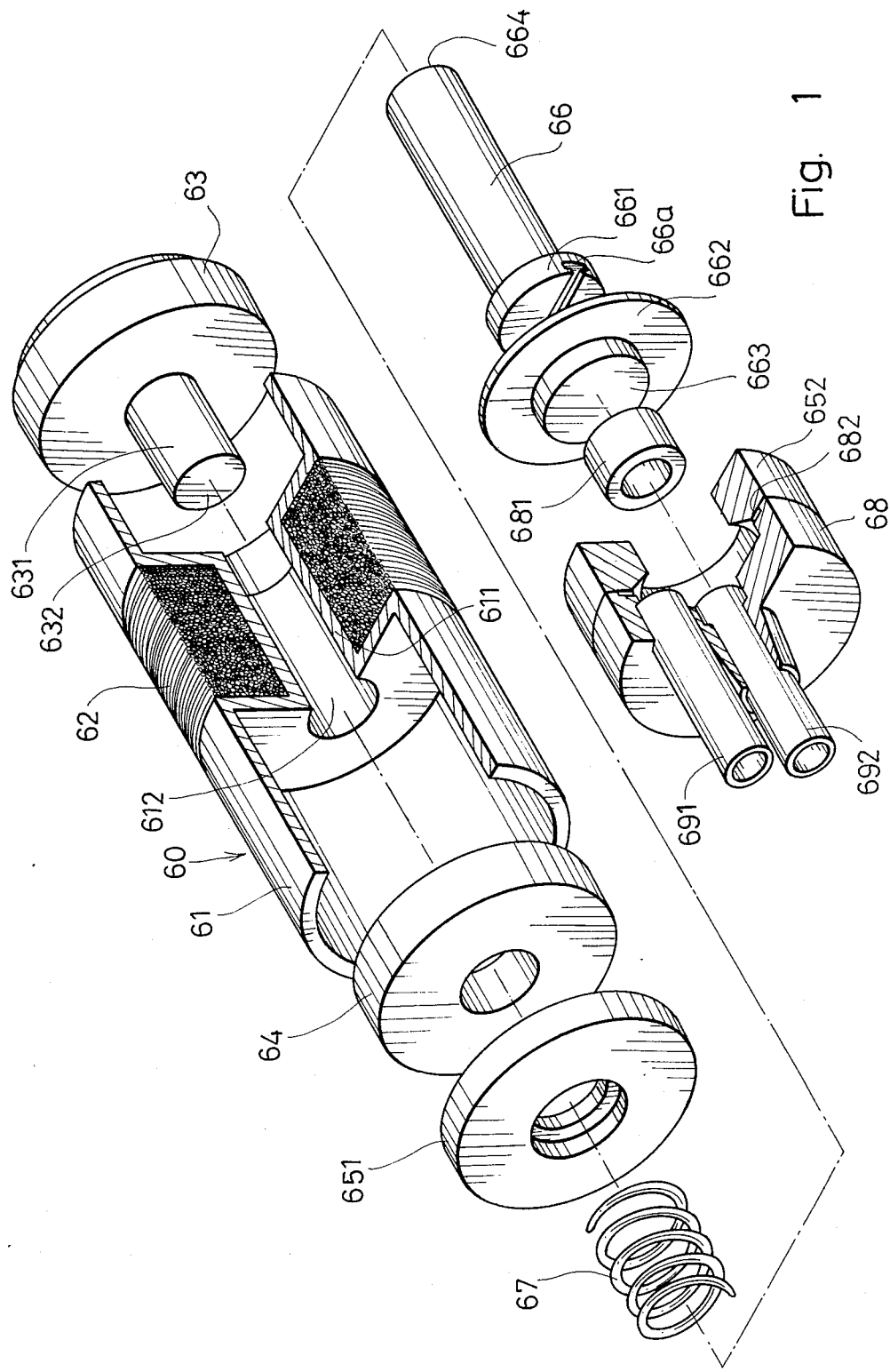
FIG. 1 is an exploded perspective view of a preferred embodiment of the electromagnetic permeable-shell-free diaphragm valve in accordance with this invention.
Figure 2:
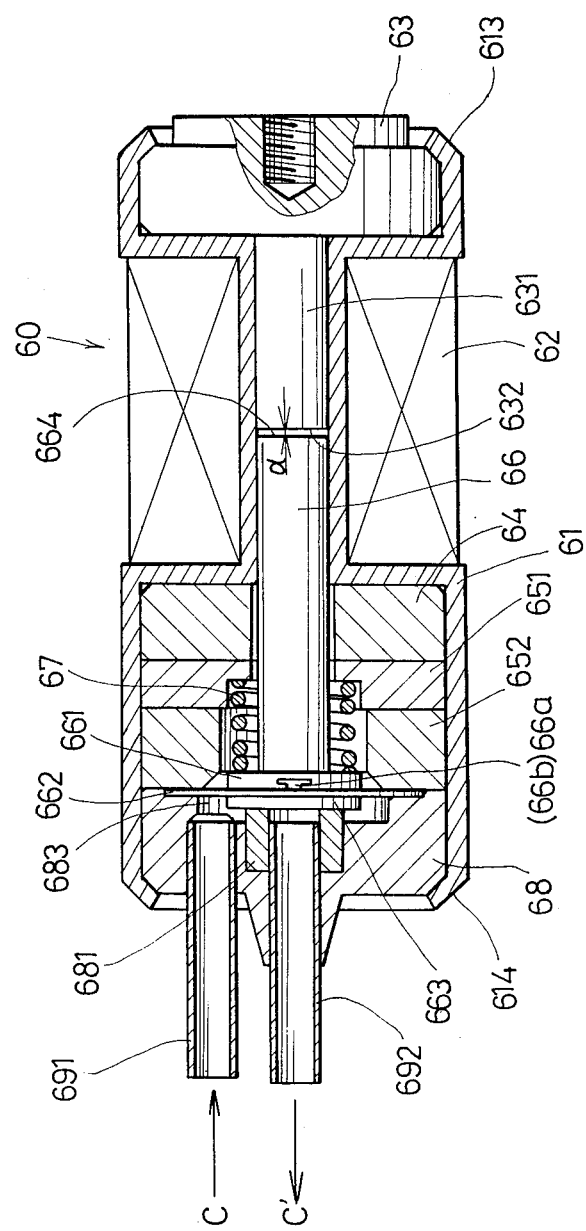
FIG. 2 is a sectional view along the longitudinal axis of the electromagnetic permeable-shell-free diaphragm valve shown in FIG. 1.

FIG. 1 is an exploded perspective view of the electromagnetic permeable-shell-free diaphragm valve 60. The valve 60 comprises a shell 61, a coil 62, a stator 63, a magnetic flux permeable block 64, a spring seat 651, an adjusting block 652, a valve stem 66, a diaphragm 662, a coil spring 67, and a valve seat 68. The cylindrical shell 61 is made of non-permeable material, such as aluminum alloy, and is provided with a necked portion 611 in the vicinity of the middle portion thereof, and the coil 62 is wound around the outer peripheral surface of the necked portion 611. The stator 63 is made of permeable material such as ferronickel, and is provided with a cylindrical lug 631 on the left side portion thereof for inserting into the through hole 612 formed within the neck portion 611 when the valve 60 is assembled. The permeable block 64 is also made of permeable material, and the spring seat 651 abutting the left side surface of the permeable block 64 accommodates the right portion of spring 67 which sleeves the valve stem 66. When assembled, the right end portion of the valve stem 66 is inserted through the central holes of the adjusting block 652, the spring seat 651 and the permeable block 64 (see FIG. 2). There is provided a flange 661 on the right end portion of the valve stem 66 for cooperating with the spring seat 651 to constrain the spring 67 between them, and a T-slot 66a is formed in the left side surface of the flange 661 for accommodating the T-shaped rib 66b (see FIG. 2) formed integrally with the diaphragm 662, which is made of elastic material such as rubber. The diaphragm 662 can be molded directly on the left side surface of the flange 661 so that the diaphragm 662 looks like a part of the valve stem 66. The adjusting block 652 and the valve seat 68 are separate parts abutting together to provide a ring shaped slot 682 for accommodating the outer peripheral rim of the diaphragm 662. When assembled, the adjusting block 652 and the valve seat 68 are compelled to come close to clamp the outer peripheral rim of the diaphragm tightly. By this arrangement, the slide portion of the stem 66 is isolated from the ink. An inlet pipe 691 and an outlet pipe 692 are mounted in the valve seat 68 for intaking and draining the ink, and a rubber seat 681 is secured air-tight on the outer peripheral surface of the right end portion of the outlet pipe 692 whose left end portion is fitted with an outlet hose 693 (see FIG. 5). When assembled, there is a clearance "d" (see FIG. 2) between the left end surface 632 of the stator 63 and the right end surface 664 of the valve stem 66. The clearance "d" is the stroke of the valve stem 66 during operation, and the stroke can be adjusted by selecting the thickness of the spring seat 651. Similarly, the preload of the spring 67 can be adjusted by selecting the thickness of the adjusting block 652. When the valve 60 is assembled, the end rims 613, 614 of the shell 61 are bent inward (see FIG. 2) to secure the parts accommodated within the shell 61. It should be noted that the spring 67 will urge the left side surface 663 of the diaphragm 662 against the right side rim surface of the rubber seat 681 to block the outlet pipe 692.

The following is the description of the operation of the valve 60.

When an electric current flows through the coil 62, the magnetic flux induced by the coil 62 will pass through the stator 63 and the valve stem 66 to make the stator 63 and the stem 66 attract each other, and the stem 66 will move against the force of the spring 66 to meet the stator 63, and the left side surface 663 of the diaphragm 662 will leave the right side rim surface of the rubber seat 681 to let the pressurized ink flow into the room 683 formed between the diaphragm 662 and the valve seat 68, and flow toward the nozzle unit 352 by way of the outlet hose 693. When the electric current passing through the coil 62 is cut off, the attraction force between the stator and the valve stem 66 will disappear, and the valve stem 66 will be urged toward the valve seat 68 by the spring 67; then the outlet pipe 692 will be blocked again.

It should be noted that the valve according to this invention can also be used to pump other liquids, such as chemical products, although it is described as an ink-pumping device.

As described above, the diaphragm of the valve according to this invention isolates the slide portion of the stem from the ink, so that the reciprocating motions of the valve stem will not be impeded when the ink is dehydrated.

Furthermore, the construction of the valve according to this invention is simple, and it is not necessary to install a permeable shell, so that the manufacturing cost is lower than that of the conventional valve.

Additionally, the rubber seat and the diaphragm of the valve according to this invention are made of resilient material, so that the bouncing phenomenon induced by impact can be eliminated, and thus the high frequency response of the valve can be enhanced.

Moreover, the efficiency of the heat dissipation will be improved, particularly at high-frequency operation, since the coil is directly disposed outside the shell of the valve.

Although the present invention has been described in its preferred form with a certain degree of particularity, it is understood that the present disclosure of the preferred form has been somewhat changed in so far as the details of construction and the combination and arrangement of parts may be referred to without departing from the spirit and scope of the invention as hereinafter claimed.

What is claimed is:

1. An electromagnetic permeable-shell-free diaphragm valve comprising:
    a shell made of non-permeable material;
    a coil wound around the outside of said shell, the outer surface of said coil being directly exposed to the atmosphere for improved heat dissipation;
    a stator made of permeable material, fixed within said shell in the vicinity of said coil;
    a valve stem made of permeable material, for being slideable within said shell, having a first end portion opposite said stator and a second end portion;
    an elastic diaphragm secured to said second end portion of said valve stem;
    means for urging said first end portion of said stem apart from said stator;
    a valve seat disposed within said shell for securing said elastic diaphragm to form a room therebetween;
    an inlet pipe communicating with said room; and
    an outlet pipe communicating with said room, having one end rim penetrating into said room, which end rim is opposite the said elastic diaphragm,
    said urging means urges said elastic diaphragm against said end rim to block said outlet pipe, and when an electric current passes through said coil, the magnetic flux induced by said coil drives said first end portion of said valve stem to move against the urging force of said urging means toward said stator and subsequently drives said elastic diaphragm to leave said end rim and open said outlet pipe, and said urging means urges said elastic diaphragm against said end rim to block said outlet pipe again when electric current ceases to pass through said coil.

2. An electromagnetic permeable-shell-free diaphragm valve as claimed in claim 1, wherein said urging means comprises:
    a coil spring sleeved around said valve stem;
    a flange formed integrally with said second end portion of said valve stem;
    a spring seat secured within said shell and sleeved around said valve stem to cooperate with said flange to restrain said coil spring therebetween.

3. An electromagnetic permeable-shell-free diaphragm valve as claimed in claim 1, wherein the outer peripheral rim of said elastic diaphragm is secured airtight on said valve seat.

4. An electromagnetic permeable-shell-free diaphragm valve as claimed in claim 1, further comprising a rubber seat secured air-tight around the outside of said end rim of said outlet pipe to absorb the impact between said end rim of said outlet pipe and said elastic diaphragm urged by said urging means, when electric current ceases passing through said coil.

* * * * *